United States Patent
Fieselmann et al.

(10) Patent No.: US 12,412,377 B2
(45) Date of Patent: Sep. 9, 2025

(54) VALIDATION OF AI-BASED RESULT DATA

(71) Applicant: Siemens Healthcare GmbH, Erlangen (DE)

(72) Inventors: Andreas Fieselmann, Erlangen (DE); Christian Huemmer, Lichtenfels (DE); Ramyar Biniazan, Nuremberg (DE); Ludwig Ritschl, Buttenheim (DE)

(73) Assignee: Siemens Healthineers AG, Forchheim (DE)

( * ) Notice: Subject to any disclaimer, the term of this patent is extended or adjusted under 35 U.S.C. 154(b) by 348 days.

(21) Appl. No.: 17/888,572

(22) Filed: Aug. 16, 2022

(65) Prior Publication Data

US 2023/0054619 A1 Feb. 23, 2023

(30) Foreign Application Priority Data

Aug. 20, 2021 (DE) .................. 10 2021 209 169.5

(51) Int. Cl.
*G06V 10/776* (2022.01)
*G06T 5/50* (2006.01)
*G06T 5/70* (2024.01)
*G06V 10/75* (2022.01)

(52) U.S. Cl.
CPC ............ *G06V 10/776* (2022.01); *G06T 5/50* (2013.01); *G06T 5/70* (2024.01); *G06V 10/751* (2022.01)

(58) Field of Classification Search
CPC .. G06V 10/776; G06V 10/751; G06V 10/765; G06T 5/50; G06T 5/70; G06F 18/24765; G06F 18/24317
See application file for complete search history.

(56) References Cited

U.S. PATENT DOCUMENTS 10,474,934 B1 * 11/2019 Cosic ................... G06V 30/194
10,970,577 B1 * 4/2021 Song ..................... G06N 20/00
(Continued)

FOREIGN PATENT DOCUMENTS

EP 2762072 A1 8/2014

OTHER PUBLICATIONS

(Lak17) Lakshminarayanan B. et al.:"Simple and Scalable Predictive Uncertainty Estimation using Deep Ensembles", 31st Conference on Neural Information Processing Systems (NIPS 2017), Long Beach, CA, USA.
(Continued)

*Primary Examiner* — Santiago Garcia
(74) *Attorney, Agent, or Firm* — Harness, Dickey & Pierce, P.L.C.

(57) ABSTRACT

In a method, comparison features are extracted from labeled reference image data. Features are also extracted from the image data. A statistical comparison of the comparison features with the features then takes place. On the basis of the statistical comparison and a quality criterion, the quality of the AI-based result data is determined. A method for correcting result data is additionally described. Furthermore, a method for AI-based acquisition of result data on the basis of measured examination data is described. Also described is a validation entity. An entity for correcting result data is additionally described. Furthermore, an entity for acquiring result data is described. Also described is a medical imaging entity.

21 Claims, 5 Drawing Sheets

(56) References Cited

U.S. PATENT DOCUMENTS

| | | | |
|---|---|---|---|
| 2008/0292194 A1* | 11/2008 | Schmidt | G06T 7/0012 |
| | | | 382/131 |
| 2014/0341471 A1 | 11/2014 | Ono et al. | |
| 2017/0211150 A1* | 7/2017 | Breen | G01N 33/5743 |
| 2017/0372155 A1 | 12/2017 | Odry et al. | |
| 2021/0118197 A1* | 4/2021 | Gao | G06T 11/008 |
| 2022/0096034 A1 | 3/2022 | Herbst et al. | |
| 2022/0139531 A1* | 5/2022 | Wang | G16H 50/20 |
| | | | 382/128 |
| 2022/0139552 A1* | 5/2022 | Binder | G16H 30/40 |
| | | | 705/2 |
| 2022/0277452 A1* | 9/2022 | Vaidyanathan | G16H 30/40 |
| 2022/0351530 A1* | 11/2022 | Zaritsky | G06V 20/695 |

OTHER PUBLICATIONS (Man17) Mandelbaum A. et al."Distance-based Confidence Score for Neural Network Classifiers", School of Computer Science and Engineering Hebrew University of Jerusalem, Israel, Sep. 2017.

(Arun20) Arun N. et al.:"Assessing the (Un)Trustworthiness of Saliency Maps for Localizing Abnormalities in Medical Imaging", Aug. 2020 [Arun20] https://arxiv.org/abs/2008.02766.

Subramanian V. et al.:"Automated Detection and Type Classification of Central Venous Catheters in Chest X-Rays", Jul. 2019, [Sub19] https://www.researchgate.net/publication/334223370_Automated_Detection_and_Type_Classification_of_Central_Venous_Catheters_in_Chest_X-Rays.

* cited by examiner

VALIDATION OF AI-BASED RESULT DATA

CROSS-REFERENCE TO RELATED APPLICATION(S)

The present application claims priority under 35 U.S.C. § 119 to German Patent Application No. 102021209169.5, filed Aug. 20, 2021, the entire contents of which are incorporated herein by reference.

FIELD

One or more example embodiments of the present invention relate to a method for validating result data that is acquired by AI-based mechanisms and/or means. One or more example embodiments of the present invention also relate to a method for correcting result data. One or more example embodiments of the present invention further relate to a method for AI-based acquisition of result data on the basis of measured examination data. In addition, one or more example embodiments of the present invention relate to a validation entity. One or more example embodiments of the present invention also relate to an entity for correcting result data. One or more example embodiments of the present invention further relate to an entity for acquiring result data. One or more example embodiments of the present invention also relate to a medical imaging entity.

BACKGROUND

Modern imaging methods are often applied in order to generate two-dimensional or three-dimensional image data which can be used to visualize a patient being represented, e.g. a human or an animal, and can also be used for further applications.

Artificial intelligence (abbreviated to AI) and in particular deep learning or machine learning are methods that are used for image segmentation, object detection, classification and regression problems. In the case of deep learning or machine learning, a model is trained with the aid of training data to determine result data, so-called labels, on the basis of input data, e.g. medical image data. Such labels may comprise image-based labels which relate to a whole image. For example, an image may be assigned the result that it shows a pathology. However, labels can also relate to sections of an image, e.g. the designation of an object or body region in a larger image. After training, the model can be used to determine result data on the basis of new input data.

AI-based predictions have a degree of uncertainty. It is therefore desirable to check the reliability of such models. Such models do not provide any comparison variables for their individual predictions. If a trained neural network makes a false prediction, an additional measure is required in order to be sure that the whole system does not fail. In other words, the neural network has no idea how its results should turn out and therefore makes predictions solely on the basis of the input data.

An additional check is therefore required in respect of such a prediction model based on artificial intelligence.

A number of methods are already available for increasing the transparency and reliability of AI-based result data. Increased transparency in this context means that the user is put in a position to understand how the result data is generated. In this case, image regions are visualized which are used as a basis for the AI-based result data, e.g. activation maps, segmentations or object detections. Such methods are described in https://arxiv.org/abs/2008.02766 or in Nishanth Arun et al., "Assessing the (Un)Trustworthiness of Saliency Maps for Localizing Abnormalities in Medical Imaging". A degree of transparency is indeed achieved thereby, but no explicit information is provided for checking the reliability of the computed results.

The reliability, i.e. a measure for determining the certainty of result data, can be specified by outputting a confidence value. Such a value represents the sensitivity or specificity of an algorithm. This specifies an average reliability, but does not specify explicit information relating to a current computation or current result data.

A degree of uncertainty can also be taken into consideration in an AI-based training method. Such an approach is described in https://arxiv.org/pdf/1709.09844.pdf or in Amit Mandelbaum et al., "Distance-based Confidence Score for Neural Network Classifiers". However, such systems usually fail when using input data which differs significantly from the training data. Such a situation is also referred to as an out-of-domain situation.

Averaging is also possible for an ensemble of result data so that an uncertainty can be estimated. Such an approach is described in https://papers.nips.cc/paper/2017/file/9ef2ed4b7fd2c810847ffa5fa85bce38-Paper.pdf or in Balaji Lakshminarayanan et al., "Simple and Scalable Predictive Uncertainty Estimation using Deep Ensembles". However, multiple algorithms are required for this task, which is correspondingly resource intensive.

SUMMARY

An object of one or more example embodiments of the present invention is therefore to generate results with greater reliability, said results being generated by AI-based means, mechanisms or in an AI-based manner, in particular when evaluating medical image data.

This object is achieved by a method for validating result data that is acquired using AI, a method for correcting result data, a method for AI-based acquisition of result data on the basis of measured examination data, by a validation entity, an entity for correcting result data, an entity for acquiring result data and by a medical imaging entity.

It should be mentioned at this point that the methods described below are preferably performed in a fully automated manner, such that the user does not need to intervene in the progress of the respective method or even independently to perform individual steps in order to acquire a result or partial result of one of the methods.

As part of the inventive method for validating result data that is acquired using AI, comparison features are extracted from reference result data in a rule-based manner. Artificial intelligence or algorithms having artificial intelligence properties are effectively data processing processes with a learning capability. Methods for reproducing general rules on the basis of a volume of data are referred to as machine learning in this context. Typical structures for AI-based algorithms are artificial neural networks.

The aforementioned reference result data can comprise so-called labels, with which AI-based models are trained. The reference result data can also be generated by expert knowledge. The rules comprise relations between labels or components of result data. Typical rules are based on anatomical or physical characteristics of the examination object. Distance relationships between landmarks in medical image data are one example of such rules.

Features are also extracted from the actual result data in a rule-based manner likewise. The result data can be based on image data, for example, and can include annotations or labels in the image data. The labels can comprise so-called "image-level" labels which relate to the whole image, or so-called labels for ROIs (ROI=region of interest) which relate to partial regions of an image. Following thereupon, a statistical comparison is made between the comparison features and the features that are assigned to current result data. Since the comparison features are statistically distributed, a statistical evaluation is performed at this point. A statistical evaluation is understood to mean that the distribution of the comparison features in a representative volume is taken into consideration and this distribution is used as a reference for a comparison with the features that are assigned to the current result data.

A Euclidian metric can be used as a comparison scale, for example. So-called clustering methods can also be used for the statistical comparison between the currently extracted features and the comparison features.

For example, the pectoral muscle is always arranged "in the top corner" of an image in the mediolateral oblique view (MLO view). This rule-based comparison feature can now be compared with the corresponding feature that was acquired using the current result data. If the region identified as "pectoral muscle" in a currently recorded medical image is situated "in the top left-hand corner", this comparison result can be seen as an indication of the validity of the current result data.

On the basis of the statistical comparison and a predefined quality criterion, the quality of the result data that was determined using AI is determined. Such a quality criterion can be e.g. a threshold value which must not be exceeded in the comparison described. If it is exceeded, the result data is classified as not reliable. Increased transparency is advantageously achieved when assessing the reliability of the result data. On the basis of the validation and as explained in detail below, it is even possible automatically to perform a correction of result data that is classified as not reliable, so that the checked data is corrected and need not be discarded, even following a negative validation result, and can instead be used for the original analysis process, e.g. an image segmentation, after correction.

As part of the inventive method for correcting result data, a validation result is determined on the basis of the inventive method for validating result data that is acquired using AI. Moreover, corrected result data is generated in the event that the validation result is negative. The corrected result data can preferably be generated by capturing substitute result data from the examination result again, and replacing the result data with the substitute result data. According to this variant, the generation of the result data is simply repeated in the event that the validated result data is determined to be invalid.

However, the result data can also be corrected directly on the basis of the comparison of the comparison features with the features. The relationship between the comparison features and the reference result data is already known or can easily be determined with the aid of the existing labeled training data.

If an extracted feature is now corrected in such a way that it becomes valid in a statistical comparison with the comparison features, it is also possible to generate corrected result data on the basis of this correction by applying the rules that were applied during the extraction of the comparison features in a quasi-inverse manner.

Unreliable result data is advantageously not only detected but is even replaced automatically, so that the user is provided with valid result data without having to intervene and is spared the expense of time and effort in comparison with a conventional approach.

As part of the inventive method for AI-based acquisition of result data on the basis of measured examination data, preferably medical image data, measured examination data is captured from an examination object. This measured examination data can comprise e.g. medical image data relating to a patient. Following thereupon, result data is determined using AI on the basis of the measured examination data. Such result data can comprise e.g. annotations to the image data. For example, lesions are specified at specific positions in individual segments of an examination image.

Following thereupon, a validation result is determined by applying the inventive method for validating result data that is acquired using AI to the result data that has been determined. If it is now determined on the basis of the validation that the segmentation was not correct, e.g. because distances between landmarks representing the comparison features in this case do not conform with the reference features, i.e. distances between the same landmarks that were acquired on the basis of a set of statistics, then result data is acquired on the basis of the validation result and the inventive method for correcting result data. As mentioned above, the known relation between the comparison features and the reference result data can be used for the purpose of determining corrected result data. The method for AI-based acquisition of result data on the basis of measured examination data shares the advantages of the inventive method for correcting result data.

The inventive validation entity has an extraction unit for rule-based extraction of comparison features from labeled reference result data and for the extraction of features from result data. The inventive validation entity also comprises a comparison unit for statistical comparison of the comparison features with the features. Part of the inventive validation entity is also a validation unit for determining the quality of the AI-based result data on the basis of the statistical comparison and a predefined quality criterion. The inventive validation entity shares the advantages of the inventive method for validating result data that is acquired using AI.

The inventive entity for correcting result data has a validation entity according to one or more example embodiments of the present invention, for determining a validation result on the basis of result data that was acquired using AI and reference result data, and a correction unit for generating corrected result data in the event that the validation result is negative. The inventive entity for correcting result data shares the advantages of the inventive method for correcting result data.

The inventive entity for acquiring result data has an input interface for capturing measured examination data from an examination object. Additionally, the inventive entity for acquiring result data comprises a determination unit for AI-based determination of result data on the basis of the measured examination data. Part of the inventive entity for acquiring result data is also a validation entity for determining a validation result on the basis of the determined result data and on the basis of reference result data. As mentioned above, for the purpose of validation, comparison features are acquired from a set of comparison statistics and statistically compared with corresponding features that are determined from the current result data. Following thereupon, a validation result is output on the basis of which a correction unit, this likewise being part of the inventive entity for acquiring result data, determines corrected result data in the event that the validation result is negative. The inventive entity for acquiring result data shares the advantages of the inventive method for AI-based acquisition of result data on the basis of measured examination data.

The inventive medical imaging entity, preferably an x-ray imaging entity, more preferably a CT system or an MR system, comprises a recording unit, e.g. a scan unit, for generating image data from an examination region. Part of the inventive medical imaging entity is also a determination unit for AI-based determination of result data on the basis of the image data. The inventive medical imaging entity also comprises an inventive validation entity for validating the result data. Part of the inventive medical imaging entity can also be an inventive entity for correcting result data or an inventive entity for acquiring result data. The inventive medical imaging entity shares the advantages of the inventive validation entity and the inventive entity for correcting result data or the inventive entity for acquiring result data.

Some of the components of the inventive validation entity, the inventive entity for correcting result data, the inventive entity for acquiring result data and the inventive medical imaging entity can be largely designed in the form of software components. This relates in particular to parts of the extraction unit, the comparison unit and the validation unit of the validation entity, parts of the correction unit of the entity for correcting result data, and parts of the determination unit of the entity for acquiring result data and of the medical imaging entity. It is however also possible in principle to realize these components partly in the form of programmable hardware, e.g. FPGAs and the like, especially if particularly rapid calculations are involved. The required interfaces can likewise be designed as software interfaces, e.g. if data is merely being transferred from other software components. They can however also be designed as hardware-based interfaces controlled by suitable software.

A largely software-based realization has the advantage that computer units or control entities of medical imaging entities that are already in use can also be upgraded easily via a software update in order to work in the inventive manner. To this extent, the object is also achieved by a corresponding computer program product comprising a computer program which can be loaded directly into a storage entity of a computer unit or a control entity of a medical imaging entity and program sections for executing all steps of the respective inventive methods when the computer program is executed in the computer unit or control entity of the medical imaging entity.

In addition to the computer program, such a computer program produce can optionally comprise additional elements such as e.g. documentation and/or additional components, and hardware components such as e.g. hardware keys (dongles etc.) for using the software.

For the purpose of transportation to the storage entity of a computer unit of a medical imaging entity and/or for the purpose of storage on the computer unit of the medical imaging entity, it is possible to use a computer-readable medium such as e.g. a memory stick, a hard disk or other transportable or permanently integrated data medium on which are stored the program sections of the computer program that can be read in and executed by a computer unit. For this purpose, the computer unit can have e.g. a microprocessor or a plurality of interworking microprocessors or similar.

Further particularly advantageous embodiments and developments of the present invention are derived from the dependent claims and from the following description and the figures, wherein the independent claims in one statutory class of claim can also be developed in a similar manner to the dependent claims in another statutory class of claim.

As part of the inventive method for validating result data that is acquired using AI, the result data is preferably acquired on the basis of image data. For example, such result data can be landmarks, image properties or even interference effects such as e.g. noise contents, which can be checked via the validation. As a result of the validation, the quality of the information is advantageously protected or even improved.

As part of the inventive method for validating result data that is acquired via AI, the result data preferably comprises one of the following data types:
  image segmentations,
  detected objects,
  classifications,
  regression results.

The inventive method for validating result data that is acquired via AI can advantageously be used for completely different applications. An evaluation of image data, in particular medical image data, is however preferred. The evaluation of image data in the field of medicine generally comprises the division of the image data into different regions and the identification thereof. Such an approach is also referred to as segmentation. A segmentation in the process of AI-based evaluation of image data is usually the first step of the image analysis and comes after the image preprocessing. This can be followed by e.g. extraction of features, classification of the features, and a statement based on the classifications.

An object can be detected on the basis of one or more different extracted features, for example. One example would be e.g. a lesion, which is determined on the basis of brightness values and structural parameters or structural features.

Classification of the lesion could then take place in relation to specific special features. A classification can generally be regarded as a qualitative grading. If the results of a machine learning process are present in discrete form or if the values are qualitative, this is said to represent a classification problem.

If the results of the output of a learning process in the context of the machine learning are present in a continuous distribution whose results can assume any quantitative values in a predetermined value range, this is said to represent a regression problem.

The inventive methods can therefore be applied advantageously to very different problems which can be solved via AI, particularly in the field of evaluating medical image data for the purpose of preparing a medical opinion.

Additionally, as part of the inventive method for validating result data that is acquired via AI, the reference image data preferably comprises labeled training image data. Comparison features can advantageously be extracted from the training image data or from the labels of the training image data. The comparison features are then used as a basis for the inventive validation of result data.

In a variant of the inventive method for validating result data that is acquired via AI, one of the following measures takes place in the event that the quality criterion is not satisfied:
  information is output to a user to the effect that the reliability of the result data is not sufficient,
  the result data is corrected on the basis of the comparison features and the rules for extraction of the comparison features.

The quality criterion can comprise e.g. a threshold value. If this threshold value is exceeded in the context of the described comparison between the extracted features and the comparison features, the user is informed of the present uncertainty of the result data or the result data is suitably corrected so that it does not have to be discarded.

In an advantageous variant of the inventive method for validating result data that is acquired via AI, which is applied when evaluating image data and in the medical field in particular, the positions of landmarks are used as result data and the ratio of the minimum distance between the landmarks is used as feature data. If the minimum distance of the landmarks is known from training data or another reference data source, the positions of the landmarks as determined via AI in medical image data can advantageously be checked subsequently in respect of reliability and consistency. In this way, a medical examination or medical opinion can be made safer and more reliable, since errors in the evaluation of the medical data are detected and can even be corrected automatically if applicable.

The landmarks can preferably comprise the following bones or organs:
the collar bone,
the carina tracheae,
the atrium.

For example, an erroneous localization of landmarks in the chest region can advantageously be avoided. Such an erroneous localization can occur as a result of a collapsed lung, for example, since in such cases the positions and the extent of individual organs is altered and distances between the cited organs no longer correspond to the usual values.

An important application area of the inventive method for validating result data that is acquired via AI is the segmentation of anatomical landmarks in medical image data. In the field of mammography, for example, segmentation of the nipples and the breast muscle plays a key role in the quantitative analysis of the breast parenchyma. The cited landmarks have restrictions and can be used to check the reliability of predictions that are determined by AI.

As part of this very specific variant of the inventive method for validating result data that is acquired via AI, one of the following comparison features is used for the breast segmentation:
the segmented breast muscle in the mediolateral oblique view lies in the top corner of the image without contacting the breast skin line,
the segmented nipple region lies close to the breast muscle or the breast wall,
the segmented breast muscle should not have a larger angle than a predefined angle value,
the line of the segmented breast muscle should have a smooth edge and the derivative of the breast muscle line must not exceed a certain value,
the segmented nipple region lies close to the breast skin line and the distance between the two does not exceed a certain value.

Erroneous result data in the representations can advantageously be recognized by matching against the cited rules as part of the breast imaging. If one of the previously cited rules is not satisfied, an indication is given in respect of an erroneous AI-based evaluation of the image data.

The inventive method for validating result data that is acquired using AI can also be used as part of a procedure for reducing the image noise. A reference image noise is used as a comparison feature in this case, and the image noise of the image data is compared with the reference image noise.

The comparison feature comprises a reference image noise which is broken down into a defined number of frequency components, and the statistical comparison of the comparison features with the features includes a comparison between the frequency components of the reference image noise and frequency components of the image noise of the image data.

Following the comparison, statistical outliers are removed from each of the frequency components of the image noise of the image data, the corrected frequency components of the image noise are reassembled via mixing, and the corrected image noise is subtracted from the image data. The image quality of image data, preferably medical image data, can advantageously be improved by removing unreliable noise information.

In addition to the units mentioned above, the inventive validation entity preferably comprises a first interface for receiving reference result data which is based on training data, and a second input interface for receiving result data that was generated by an AI-based evaluation entity on the basis of image data. Labeled training data which is used in an AI-based evaluation unit for the training thereof can advantageously also be used for the validation, without having to generate additional reference data. Comparison features data can be acquired from the reference result data of the training data in this case, and used for the validation via comparison with feature data that has been acquired from current result data.

According to one or more example embodiments, AI-based means may refer to one or more processors or other processing circuitry configured to execute one or more AI or other machine learning algorithms.

BRIEF DESCRIPTION OF THE DRAWINGS

The present invention is explained again in greater detail below with reference to the appended figures and with reference to exemplary embodiments. Identical components in this case are denoted by identical reference signs in the various figures, in which.

DETAILED DESCRIPTION

Figure 1:
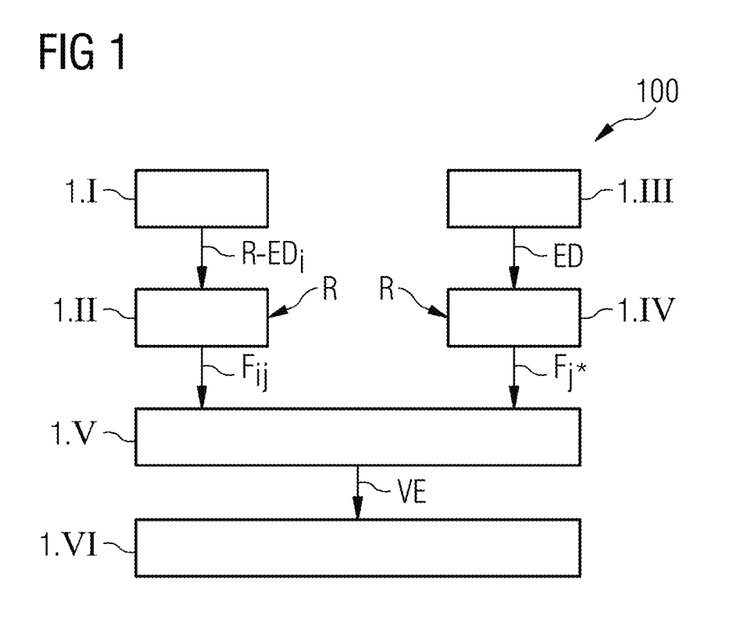
FIG. 1 shows a flow diagram which illustrates a method for validating result data that is acquired using AI according to a first exemplary embodiment of the present invention.

FIG. 1 shows a flow diagram 100 which illustrates a method for validating result data that is acquired via AI according to a first exemplary embodiment of the present invention.

In the step 1.I, result data is generated as reference result data R-EDi. The reference result data R-EDi can comprise e.g. so-called labels of training data for an AI-based method, but can also be generated independently of a training process for an AI-based method while nonetheless being of the same type as the labels of the training data used for the AI-based method. In this case, the index i specifies a number for a data record, e.g. an image data record, to which the reference result data R-EDi is assigned.

In the step 1.II, reference features Fij are extracted in a rule-based manner from the reference result data R-EDi. The index j in this case specifies a number of an extracted feature that is assigned to the ith reference result data record R-EDi. The rules R in this case comprise relations between different labels of reference result data R-EDi. These labels can comprise e.g. different anatomical or physical characteristics. The rules can be defined by specialists or determined by an algorithm or an approach that is based on machine learning.

In the step 1.III, AI-based result data ED is generated. This result data ED can be determined e.g. on the basis of data that is currently analyzed using AI, e.g. image data, and comprise records of labels which indicate characteristics of this current data.

In the step 1.IV, using the same rules R that were also applied in the step 1.II, features Fj* are extracted from the result data ED that was determined in the step 1.III.

In the step 1.V, a validation of the result data ED that was determined in the step 1.III is performed. For this purpose, the currently extracted features Fj* are statistically compared with the comparison features Fij. For example, the distance of an extracted feature Fj* from k closest neighbors can be determined and compared with a threshold value. In this way, it can be determined whether this feature behaves as expected or possibly deviates so significantly that also the assigned result data or the labels assigned to the analyzed data record cannot be classified as reliable. A Euclidian metric can be used as a comparison scale, for example. So-called clustering methods can also be used for the statistical comparison between the currently extracted features Fj* and the comparison features Fij.

In the step 1.VI, a reaction follows from the validation result VE that was obtained in the step 1.IV. One possible variant is for the validation result VE to be transferred to the user. In this way, the user is notified whether an AI-based analysis of a current data record, e.g. an image data record, is reliable or not. Alternatively or additionally, in the event that the extracted feature Fj* was classified as not representative, transformation of the extracted feature Fj* can take place so that it conforms with the comparison data record. Furthermore, the result data record can then also be modified on the basis of the rule R that was applied for the extraction of the feature Fj*, such that the result data ED thus corrected can be used subsequently and need not be discarded.

Figure 2:
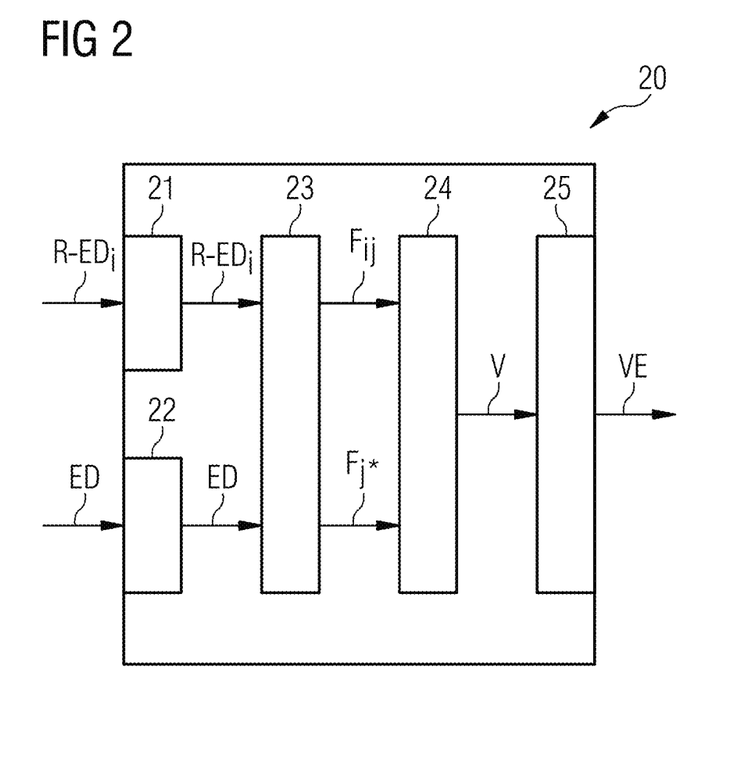
FIG. 2 shows a schematic representation of a validation entity according to an exemplary embodiment of the present invention.

FIG. 2 shows a schematic representation of a validation entity 20 according to an exemplary embodiment of the present invention. The validation entity 20 comprises a first interface 21 for the receipt of reference result data R-EDi that is based on training image data. Also part of the validation entity 20 is a second input interface for the receipt of current result data ED, this being generated on the basis of image data BD by an AI-based determination unit 32 (see FIG. 3). The validation entity 20 shown in FIG. 2 also comprises an extraction unit 23 for the rule-based extraction of comparison features Fij from the labels of the reference result data R-EDi and for the extraction of features Fj* from the labels of the currently determined result data ED. The extracted features Fj* and comparison features Fij are transferred to a comparison unit 24, which is configured to statistically compare the comparison features Fij with the features Fj* in the manner that is shown in connection with FIG. 1. The comparison result V is transferred to a validation unit 25. The validation unit 25 determines the quality of the AI-based result data ED on the basis of the statistical comparison and a predefined quality criterion.

Figure 3:
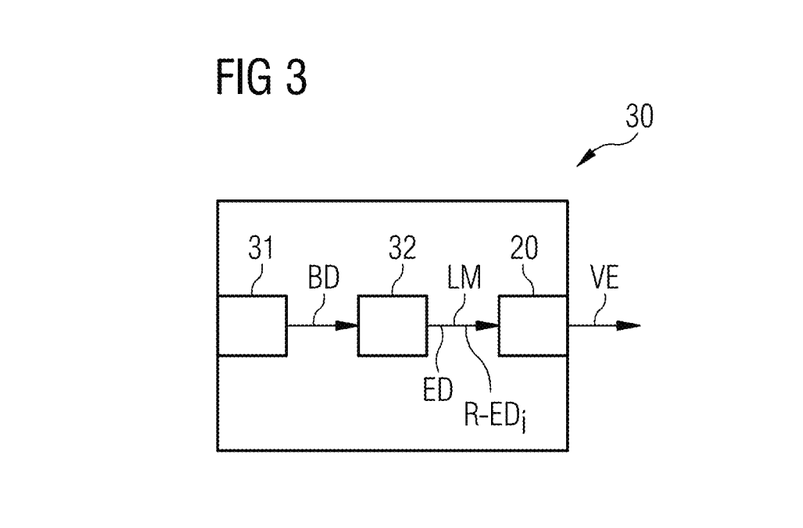
FIG. 3 shows a schematic representation of a medical imaging entity according to an exemplary embodiment of the present invention.

FIG. 3 illustrates a schematic representation of a medical imaging entity 30 according to an exemplary embodiment of the present invention.

Part of the medical imaging entity 30 is a recording unit 31 for generating image data BD from an examination region. The image data BD is transferred to a determination unit 32, which is likewise part of the medical imaging entity 30, for AI-based determination of result data ED on the basis of the image data BD. Finally, the medical imaging entity 30 also comprises the validation entity 20 as illustrated in FIG. 2, which outputs a validation result VE on the basis of the currently generated result data ED.

Figure 4:
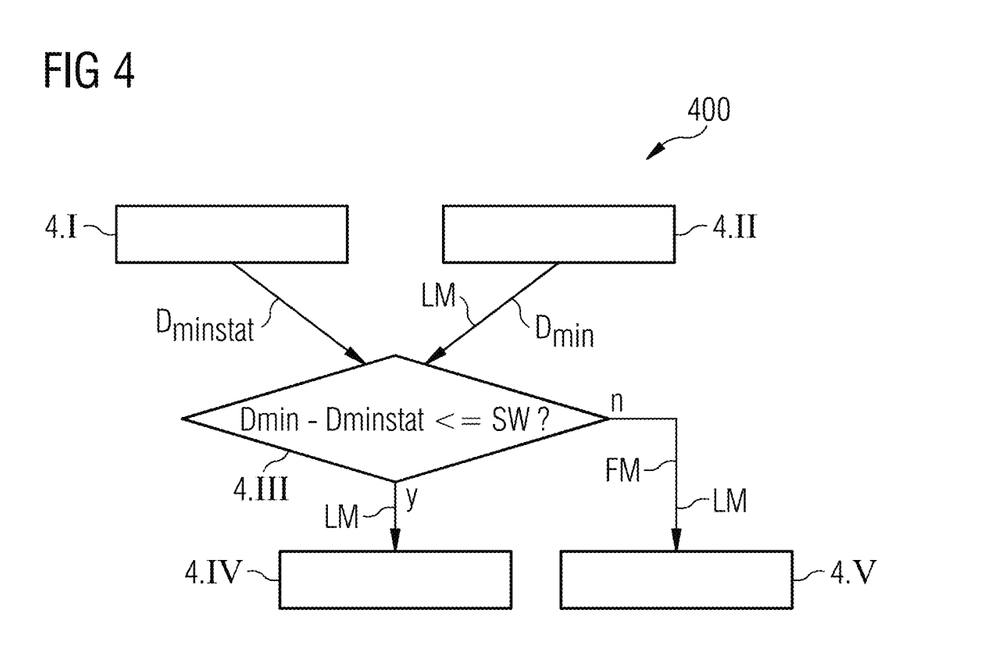
FIG. 4 shows a flow diagram which illustrates a method for validating result data that is acquired via AI according to a second exemplary embodiment of the present invention.

FIG. 4 shows a flow diagram which illustrates a method for validating result data that is acquired using AI according to a second exemplary embodiment of the present invention.

In the step 4.I, the statistically likely positions of body parts, in this case the collar bone, the carina tracheae and the atrium, are determined on the basis of anatomical training image data. Furthermore, minimum distances Dminstat between the cited body parts are statistically determined as rule-based comparison features Fij.

In the step 4.II, on the basis of a trained AI-based model the cited body parts, i.e. the collar bone, the carina tracheae and the atrium, are localized as landmarks LM in the current image data and, on the basis of the current position of these body parts or landmarks, minimum distances Dmin between these body parts are calculated as features Fj*.

In the step 4.III, a statistical comparison of the current features Fj* with the comparison features Fij is performed. In this case, it is determined whether a difference between the statistical minimum distances Dminstat between the body parts and the current value Dmin falls below a threshold value SW.

If the comparison result is positive, this being indicated by "y" in FIG. 4, the generated landmarks LM, i.e. the positions of the cited body parts, are output to the user as reliable result data in the step 4.IV. If the comparison result is negative, this being indicated by "n" in FIG. 4, an error report FM comprising information about which of the landmarks LM is unreliable is output in the step 4.V. On the basis of this information, the user can identify e.g. the cause of this unreliable result. For example, if the distance between the collar bone and the carina tracheae is incorrect, it can be inferred that the lung has possibly collapsed.

Figure 5:
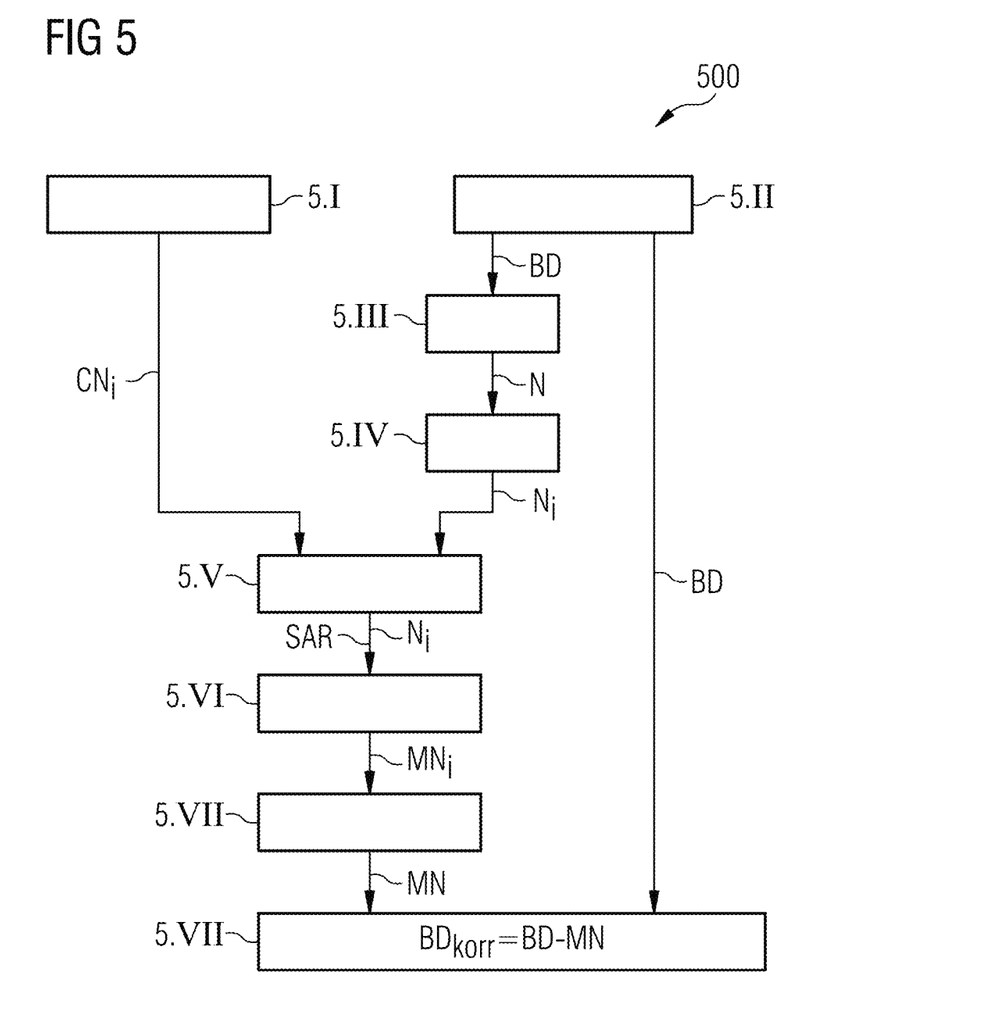
FIG. 5 shows a flow diagram which illustrates a method for validating result data that is acquired via AI according to a third exemplary embodiment of the present invention.

FIG. 5 shows a flow diagram 500 which illustrates a method for validating result data that is acquired via AI according to a third exemplary embodiment of the present invention, in which noise contents of image data are determined and removed.

In the step 5.I, characteristic noise data CNi for predefined image recording parameters is determined. The noise which occurs in image data can be caused by e.g. electronic noise or photonic noise of the detectors. Electronic noise has a Gaussian distribution while photonic noise has a Poisson distribution. The characteristic noise data CNi is already present as components of the characteristic noise that have been broken down according to frequency components.

In the step 5.II, currently captured image data BD is received by a recording unit. In the step 5.III, noise contents N in the image data BD are identified and extracted. The identification of the noise contents in this exemplary embodiment is likewise effected using AI.

In the step 5.IV, the noise contents N are broken down into a defined number of noise components Ni, each of these being assigned to different frequency bands. In the step 5.V, each of the frequency bands is examined for statistical outliers SAR. In the step 5.VI, noise components MNi are generated in which the statistical outliers SAR have been corrected. In other words, the statistical outliers SAR are removed from the respective noise components Ni. This removal takes place on the basis of a comparison between the noise components Ni and the characteristic noise data CNi. The corrected noise components MNi are subsequently reassembled in the step 5.VII to form a corrected and combined noise content MN. Finally, in the step 5.VIII, image data BDkorr is generated in which noise effects have been corrected by subtracting the corrected and combined noise content MN from the image data BD that was originally received.

Figure 6:
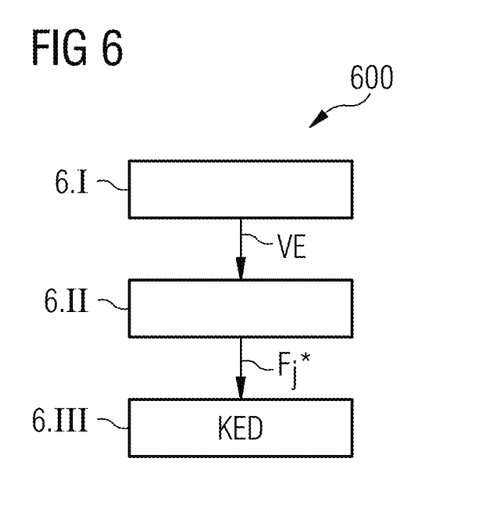
FIG. 6 shows a flow diagram which illustrates a method for correcting result data according to an exemplary embodiment of the present invention.

FIG. 6 shows a flow diagram 600 which illustrates a method for correcting result data according to an exemplary embodiment of the present invention.

In the step 6.I, a validation result VE is first determined using a method for validating result data that is acquired using AI on the basis of result data, as illustrated above in connection with FIG. 1, 4 or 5. In the step 6.II, a feature Fj* extracted from the result data is transformed in such a way that it becomes valid in a statistical comparison with the comparison features Fij. For example, it may be determined on the basis of the statistical comparison that the extracted feature, e.g. a distance between different landmarks, is an "outlier". The extracted feature Fj* is then corrected accordingly. In this case, it is replaced by e.g. an expected value from the set of statistics underlying the comparison. This corrected feature value is then used in the step 6.III to calculate corrected result data KED. For this calculation, the rules that were applied during the extraction of the comparison features Fij are taken into consideration, i.e. the relation between the comparison features Fij and the corresponding reference result data R-EDi.

Figure 7:
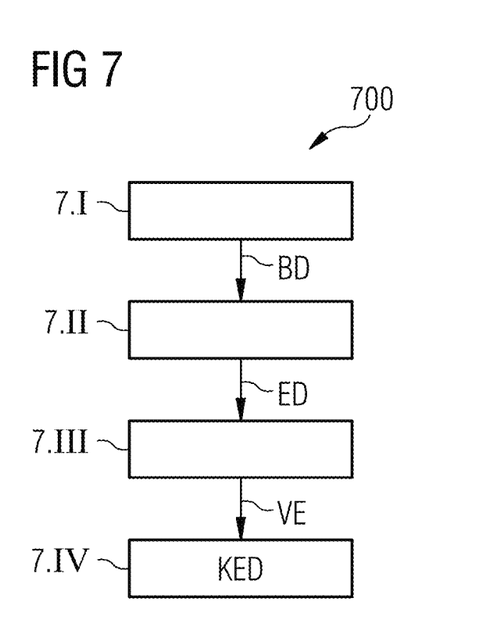
FIG. 7 shows a flow diagram which illustrates a method for AI-based acquisition of result data on the basis of measured examination data.

FIG. 7 shows a flow diagram 700 which illustrates a method for AI-based acquisition of result data on the basis of measured examination data.

In the step 7.I, image data BD is captured from an examination object. On the basis of the image data BD, result data ED is determined using AI in the step 7.II. In the step 7.III following thereupon, on the basis of the result data ED, a validation result VE is determined by applying an7 inventive method for validating the determined result data ED. Finally, in the step 7.IV, corrected result data KED is determined on the basis of the method for correcting result data as shown in FIG. 6.

Figure 8:
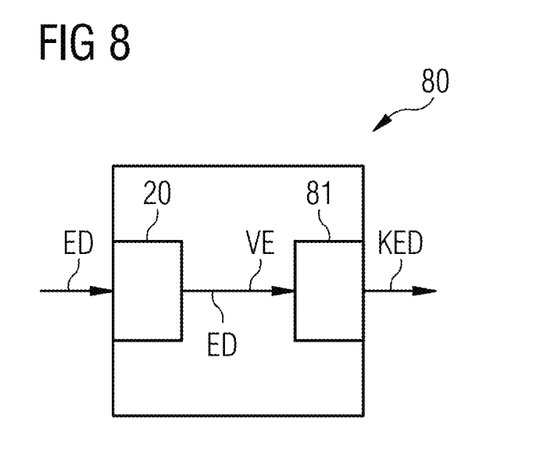
FIG. 8 shows a schematic representation of an entity for correcting result data according to an exemplary embodiment of the present invention.

FIG. 8 illustrates a schematic representation of an entity for correcting result data 80 according to an exemplary embodiment of the present invention.

The entity illustrated in FIG. 8 for correcting result data 80 has a validation entity 20 as illustrated in FIG. 2. The validation entity receives result data ED and determines a validation result VE on the basis of the result data ED that is acquired using AI and on the basis of reference result data R-EDi, which is obtained from e.g. a database (not shown).

Part of the entity for correcting result data 80 is also a correction unit 81 for generating corrected result data KED in the event that the validation result VE is negative.

Figure 9:
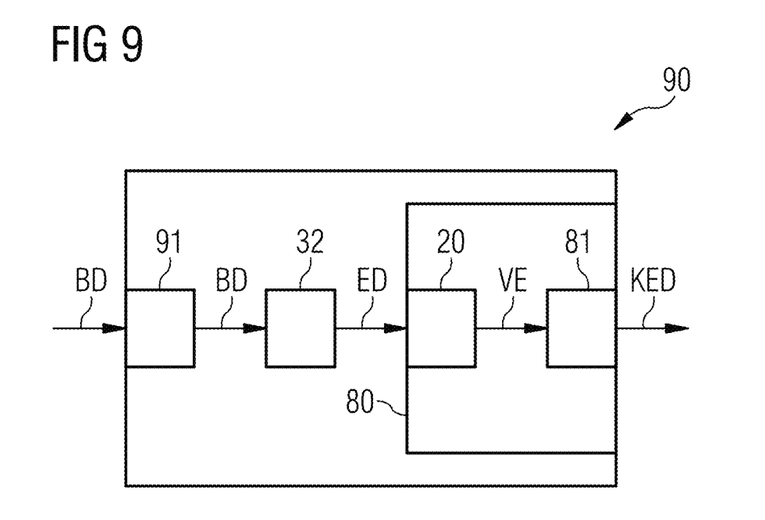
FIG. 9 shows a schematic representation of an entity for acquiring result data according to an exemplary embodiment of the present invention.

FIG. 9 shows a schematic representation of an entity for acquiring result data 90 according to an exemplary embodiment of the present invention.

The entity for acquiring result data 90 comprises an input interface 91 for capturing image data BD from an examination object. Part of the entity for acquiring result data 90 is also a determination unit 32 for AI-based determination of result data ED on the basis of the measured examination data BD. Furthermore, the entity for acquiring result data also comprises the entity for correcting result data 80 as illustrated in FIG. 8, which in turn comprises a validation entity 20 for determining a validation result VE on the basis of the determined result data ED and a correction unit 81 for generating corrected result data KED in the event that the validation result VE is negative.

In conclusion, it is again noted that the methods and devices described in detail above are merely exemplary embodiments which can be modified in all manner of ways by a person skilled in the art without thereby departing from the scope of the present invention. Furthermore, use of the indefinite article "a" or "an" does not preclude multiple instances of the features concerned. Likewise, the term "unit" does not preclude the relevant components consisting of or including a plurality of interacting sub-components, which can also be spatially distributed if applicable.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention was illustrated and described with regard to certain example embodiments, equivalents and changes will be made by persons skilled in the art after reading and understanding the description. This present disclosure covers all such equivalents and modifications and is limited only by the scope of the attached claims.

What is claimed is:

1. A method for validating result data acquired via artificial intelligence (AI), the result data being based on image data, and the method comprising:
   extracting comparison features from reference result data in a rule-based manner such that at least one of
      the comparison features indicate at least one of a physical or anatomical characteristic of an examination object, or the comparison features indicate a known characteristic present in an image of a given type, the result data being based on at least one image of the given type;

extracting features from the result data in the rule-based manner;

statistically comparing the comparison features with the features; and determining a quality of the result data based on the statistical comparison and a quality threshold value.

2. The method as claimed in claim 1, further comprising: acquiring the result data.

3. The method as claimed in claim 1, wherein the result data comprises:
image segmentation data;
detected objects;
classification data; or
regression data.

4. The method as claimed in claim 1, wherein, in the event that the quality of the result data is below the quality threshold value, the method comprises:
outputting information indicating that a reliability of the result data is not sufficient, or
correcting the result data based on the comparison features and rules for the extracting of the comparison features.

5. The method as claimed in claim 1, wherein
the comparison features include a reference image noise, and
the method further includes
comparing, as part of a procedure for reducing image noise of image data, the image noise of the image data with the reference image noise.

6. The method as claimed in claim 5, wherein
the reference image noise is broken down into a number of frequency components, and
the statistical comparison of the comparison features with the features includes comparing frequency components of the reference image noise with frequency components of the image noise of the image data.

7. A method for correcting result data, the method comprising:
determining a validation result based on a method for validating result data as claimed in claim 1; and
generating corrected result data in the event that the validation result is negative.

8. The method for correcting result data as claimed in claim 7, wherein the generating of the corrected result data comprises at least one of:
capturing substitute result data and replacing the result data with the substitute result data, or
correcting the result data directly based on the statistical comparison of the comparison features with the features, wherein the correcting includes
correcting an extracted feature such that the extracted feature becomes valid in a statistical comparison with the comparison features, and
generating corrected result data based on rules applied during the extracting of the comparison features.

9. A method for AI-based acquisition of result data based on measured examination data, the method comprising:
capturing the measured examination data from an examination object;
determining result data using AI based on the measured examination data;
determining a validation result based on a method as claimed in claim 1; and determining the result data, which has been corrected based on the validation result.

10. A validation entity comprising:
at least one memory; and
processing circuitry configured to, with the at least one memory, cause the validation entity to
extract comparison features from labeled reference result data in a rule-based manner such that at least one of
the comparison features indicate at least one of a physical or anatomical characteristic of an examination object, or
the comparison features indicate a known characteristic present in an image of a given type, wherein result data is based on image data of at least one image of the given type,
extract features from the result data in the rule-based manner, the result data acquired via artificial intelligence (AI);
statistically compare the comparison features with the features; and
determine a quality of the result data based on the statistical comparison and a quality threshold value.

11. The validation entity as claimed in claim 10, wherein the processing circuitry is further configured to cause the validation entity to:
determine a validation result based on the quality of the result data; and
generate corrected result data in the event that the validation result is negative.

12. The validation entity as claimed in claim 10, wherein the processing circuitry is further configured to cause the validation entity to:
capture measured examination data from the examination object;
determine the result data based on the measured examination data;
determine a validation result based on the result data; and
generate corrected result data in the event that the validation result is negative.

13. The validation entity as claimed in claim 10, wherein the processing circuitry is further configured to cause the validation entity to:
generate image data from an examination region;
determine the result data based on the image data; and
validate the result data.

14. A non-transitory computer program product including a computer program having program sections that, when executed by at least one processor at a medical imaging entity, cause the medical imaging entity to perform the method of claim 1.

15. A non-transitory computer-readable medium storing program sections that, when executed by at least one processor of a computer unit, cause the computer unit to perform the method of claim 1.

16. The method of claim 9, wherein the measured examination data is medical image data.

17. A method for AI-based acquisition of result data based on measured examination data, the method comprising:
capturing the measured examination data from an examination object;
determining result data using AI based on the measured examination data;
determining a validation result for the result data; and
determining corrected result data based on the validation result, according to the method of claim 7.

18. The validation entity as claimed in claim 11, wherein the processing circuitry is further configured to cause the validation entity to:
   generate image data from an examination region;
   determine the result data based on the image data;
   validate the result data; and
   correct the result data.

19. The validation entity as claimed in claim 12, wherein the processing circuitry is further configured to cause the validation entity to:
   generate image data from an examination region;
   determine the result data based on the image data; and
   validate the result data.

20. The method as claimed in claim 4, further comprising:
   using, as part of a procedure for reducing image noise of image data, a reference image noise as a comparison feature; and
   comparing the image noise of the image data with the reference image noise.

21. The method as claimed in claim 1, wherein the comparison features indicate a distance between landmarks of the examination object.

\* \* \* \* \*